US005863382A

United States Patent [19]

Hinton

[11] Patent Number: 5,863,382

[45] Date of Patent: *Jan. 26, 1999

[54] LABELING MACHINE WITH IMPROVED CUTTER ASSEMBLY

[75] Inventor: Gaylen Roy Hinton, Merced, Calif.

[73] Assignee: Trine Manufacturing Company, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 532,361

[22] Filed: Sep. 22, 1995

[51] Int. Cl.[6] .................... B32B 31/00

[52] U.S. Cl. .................... 156/510; 156/493; 156/488; 156/567; 156/DIG. 14; 156/DIG. 15; 83/176; 83/402

[58] Field of Search .................... 156/476, 488, 156/493, 567, 510, DIG. 14, DIG. 15, 497; 83/176, 402

[56] References Cited

U.S. PATENT DOCUMENTS

| | | | |
|---|---|---|---|
| 2,703,660 | 3/1955 | Von Hofe et al. . | |
| 3,235,433 | 2/1966 | Cvacho et al. . | |
| 3,565,724 | 2/1971 | Yamaguchui et al. . | |
| 3,577,293 | 5/1971 | Ritterhoff . | |
| 3,659,394 | 5/1972 | Hartleib et al. . | |
| 3,765,991 | 10/1973 | Hoffmann . | |
| 3,834,963 | 9/1974 | Hoffman . | |
| 3,878,960 | 4/1975 | Jonsson et al. . | |
| 4,108,709 | 8/1978 | Hoffmann . | |
| 4,108,710 | 8/1978 | Hoffmann . | |
| 4,108,711 | 8/1978 | Hoffmann . | |
| 4,124,433 | 11/1978 | Herdzina et al. . | |
| 4,207,832 | 6/1980 | Bowman et al. . | |
| 4,208,236 | 6/1980 | Santefort . | |
| 4,216,044 | 8/1980 | Herdzina et al. . | |
| 4,242,167 | 12/1980 | Hoffmann . | |
| 4,323,416 | 4/1982 | Malthouse et al. . | |
| 4,336,095 | 6/1982 | Hoffmann . | |
| 4,347,095 | 8/1982 | Yamashita . | |
| 4,360,170 | 11/1982 | Kuklies et al. | 242/56 R |
| 4,366,016 | 12/1982 | Golden, Jr. . | |
| 4,406,721 | 9/1983 | Hoffmann . | |
| 4,416,714 | 11/1983 | Hoffmann . | |
| 4,425,866 | 1/1984 | Hoffmann . | |
| 4,443,285 | 4/1984 | Roth et al. . | |
| 4,447,280 | 5/1984 | Malthouse . | |
| 4,496,409 | 1/1985 | Kontz . | |
| 4,500,386 | 2/1985 | Hoffman . | |
| 4,519,868 | 5/1985 | Hoffmann . | |

(List continued on next page.)

FOREIGN PATENT DOCUMENTS

| | | |
|---|---|---|
| 1012906 | 6/1977 | Canada . |
| 0144198A3 | 6/1985 | European Pat. Off. . |
| 0219267A2 | 4/1987 | European Pat. Off. . |
| 2427987 | 6/1978 | France . |
| 1106653 | 3/1968 | United Kingdom . |
| 2029280 | 3/1980 | United Kingdom . |

*Primary Examiner*—Merrick Dixon
*Attorney, Agent, or Firm*—Morgan & Finnegan, L.L.P.

[57] ABSTRACT

A labeling machine can rapidly change the size of labels cut from a web of labels to match different diameter containers which are then fed onto containers moving along a conveyor. A labeling drum is positioned adjacent to the conveyor for receiving cut labels and applying them onto containers fed along the conveyor. A cutter assembly is positioned adjacent to the labeling drum for receiving a web of labels, cutting the web, and transferring a cut label onto the labeling drum. The cutter assembly includes a stationary mounting plate and a drive pinion mounted on the plate. A cutter roll frame is received on the mounting plate, and includes a vertically oriented cutter roll with upper and lower ends, a central axis, and a gear at the lower end for meshing with the drive pinion and rotating the cutter roll. The cutter roll gear size is directly proportional to the size of the cutter roll. The central axis of the cutter roll is spaced farther from the drive pinion, and the outer surface of the cutter roll is spaced farther from the label drum for successive larger diameter cutter rolls.

11 Claims, 13 Drawing Sheets

U.S. PATENT DOCUMENTS 4,526,645 7/1985 Malthouse et al. .
4,544,431 10/1985 King .
4,545,832 10/1985 Hoffmann .
4,552,608 11/1985 Hoffmann et al. .
4,561,928 12/1985 Malthouse .
4,574,020 3/1986 Fosnaught .
4,604,154 8/1986 Fosnaught .
4,613,397 9/1986 Buchholz ................................ 156/476
4,629,528 12/1986 Tanaka et al. .......................... 156/351
4,632,721 12/1986 Hoffman et al. .
4,662,925 5/1987 Thimons et al. .
4,671,836 6/1987 Fumei .
4,686,931 8/1987 Difrank .
4,693,210 9/1987 Difrank .
4,694,633 9/1987 Fujio et al. .
4,704,173 11/1987 Hoffman .
4,724,036 2/1988 Hill et al. ................................ 156/497
4,724,037 2/1988 Olsen .
4,726,872 2/1988 Olsen .
4,729,811 3/1988 Difrank .
4,735,668 4/1988 Hoffmann .
4,761,200 8/1988 Szeremeta .
4,772,354 9/1988 Olsen et al. .
4,781,785 11/1988 Szeremeta .
4,804,322 2/1989 Turtschan ................................ 425/117
4,832,774 5/1989 Difrank et al. .
4,844,760 7/1989 Dickey .
4,844,957 7/1989 Hoffman .
4,923,557 5/1990 Dickey .
4,931,122 6/1990 Mitchell .
4,943,337 7/1990 Turkki ..................................... 156/384
4,977,002 12/1990 Hoffman .
4,984,413 1/1991 Cosmo .
5,037,499 8/1991 Bright et al. .
5,045,140 9/1991 Dickey .
5,078,826 1/1992 Rogall .
5,091,040 2/1992 Otruba .
5,091,239 2/1992 Przeworski et al. .
5,116,452 5/1992 Eder .
5,286,317 2/1994 Treat et al. .
5,294,283 3/1994 Guardiola ................................ 156/556
5,344,519 9/1994 Galchefski et al. .
5,350,482 9/1994 Westbury .
5,380,381 1/1995 Otruba .
5,399,216 3/1995 Galchefski et al. .
5,401,353 3/1995 Westbury et al. .
5,405,487 4/1995 Galchefski et al. .
5,437,759 8/1995 Westbury .
5,458,728 10/1995 Galchefski et al. .
5,458,729 10/1995 Galchefski et al. .

LABELING MACHINE WITH IMPROVED CUTTER ASSEMBLY

This application is related to U.S. patent application Ser. No. 08/308,243, filed Sep. 19, 1994, and entitled Labeling Machine, the disclosure which is hereby incorporated by reference in its entirety.

FIELD OF THE INVENTION

This invention relates to a labeling machine having a cutter assembly that is adapted for rapidly changing the size of labels cut from a web of labels to match different diameter containers and feeding the labels onto containers fed along a container.

BACKGROUND OF THE INVENTION

In co-pending patent application Ser. No. 08/308,243, a roll-fed labeling machine is disclosed having quick-change parts for processing containers of different sizes. The application discloses and claims an improved roll-on-pad assembly which includes an improved alignment mechanism for positioning the roll-on-pad assembly accurately with respect to the conveyor in accordance with a predetermined container size, and a latch for releasably mounting the roll-on-pad assembly in the arcuate position with respect to the conveyor. Additionally, an improved starwheel assembly has peripheral cusps formed in the circumference, each one receiving one of the predetermined size containers. A surface supports the starwheel assembly and a driving gear has an axis for driving the starwheel assembly. A plate is movable relative to the surface for supporting and aligning the starwheel assembly with respect to the conveyor, and a pivot is aligned with the driving gear axis for limiting the movement of the plate relative to the driving gear.

The cutter is disclosed as a cutter roll, i.e., a drum, having vacuum draw on its surface for retaining a web of label material thereon. The cutter roll includes a projecting label cutting blade protruding from the cutter roll. A knife edge is mounted adjacent to the cutter roll and the label drum for engaging the label cutting blade as the cutter roll rotates. The cutter roll and knife edge are positioned in close tolerance to the label drum and each other.

The number of labels that can be received on the cutter roll varies. For example, a two station label drum receives two large cut labels, while a four station label drum receives four cut labels for each revolution. It has been found that smaller labels require the use of a smaller cutter roll spaced closer to the label drum, while a larger label requires the use of a large diameter cutter roll spaced farther from the label drum. In many labeling machines, the cutters are complex and require numerous change parts and belt drives and gears. Typically, a change in cutters can take four hours. It would therefore be desirable if a cutter assembly could be designed that allows rapid change of cutter roll diameter to change the size of labels cut from a web of labels to match different diameter containers.

SUMMARY OF THE INVENTION

In accordance with the present invention, a labeling machine rapidly changes the size of labels cut from a web of labels to match different diameter containers by means of an improved cutter assembly positioned adjacent to the labeling drum for receiving a web of labels, cutting the web, and transferring the cut labels onto the labeling drum. The labeling drum is positioned adjacent to the conveyor for receiving the cut labels and applying them onto containers fed along the conveyor.

The cutter assembly is positioned adjacent to the labeling drum and includes a stationary mounting plate, a drive pinion mounted on the plate, and a drive mechanism for rotating the drive pinion. A cutter roll frame is received on the stationary mounting plate. The cutter roll frame has a vertically oriented cutter roll with upper and lower ends, a central axis defined through the cutter roll, and a gear at the lower end for meshing with the drive pinion for rotating the cutter roll. The cutter roll gear size is directly proportional to the size of the cutter roll. The central axis of the cutter roll is positioned a farther distance from the drive pinion and the cutter roll outer surface is spaced farther from the label drum surface for successive larger diameter cutter rolls. Thus, one standard cutter roll frame can be repeatedly mounted on the stationary mounting plate. The central axis of the cutter roll varies relative to the drive pinion so that different diameter cutter rolls can be used and positioned on the stationary mounting plate.

In another aspect of the present invention, the cutter assembly includes upper and lower spaced support plates and the cutter roll is rotatably mounted between the spaced support plates. The lower cutter roll end includes a drive shaft extending through the lower support plate. A gear is supported thereon and engages with the driven gear mounted on the mounting plate.

In another aspect of the present invention, the stationary mounting plate is fixed to a support surface on which the labeling machine is mounted. The stationary mounting plate includes an elongate cutout in which the drive pinion and cutter roll gear are received when the lower support plate of the cutter roll is mounted on the stationary mounting plate. The cutout is dimensioned for receiving different diameter cutter roll gears.

In still another aspect of the present invention, an encoder is mounted on the cutter roll frame and engages the cutter roll. The encoder is operatively connected to the label drum for timing label drum rotation based on cutter roll rotation. The encoder is operatively connected to a web feed mechanism for timing web feed based on the cutter roll rotation.

The cutter roll includes a label cutting blade protruding from and rotatable with the cutter roll. A knife edge is mounted adjacent to the cutter roll for engaging the label cutting blade as the cutter roll rotates to cut labels from the label web. The knife edge is mounted on a knife support block that is pivotally mounted adjacent the cutter roll. The cutter roll has a zero position relative to the cutter roll frame, and the labeling drum has a zero position relative to the cutter roll. When the lower support plate is mounted on a stationary mounting plate fixed to a support surface, the label drum and cutter roll are set in the zero positions, and no further adjustment is necessary. This simplifies the replacement of the cutter assembly.

The lower support plate is preferably secured to the stationary mounting plate by a quick release mechanism such as a quick release bolt. An overhead crane can be located adjacent to the cutter assembly for lifting the cutter roll frame off the stationary mounting plate. An eye loop could be secured onto the upper support plate attachment to a small crane hook to lift the cutter roll frame.

BRIEF DESCRIPTION OF THE DRAWINGS

The foregoing and other-objects and advantages of the present invention will be appreciated more fully from the following description, with reference to the accompanying drawings in which.

DETAILED DESCRIPTION OF THE INVENTION

Figure 1:
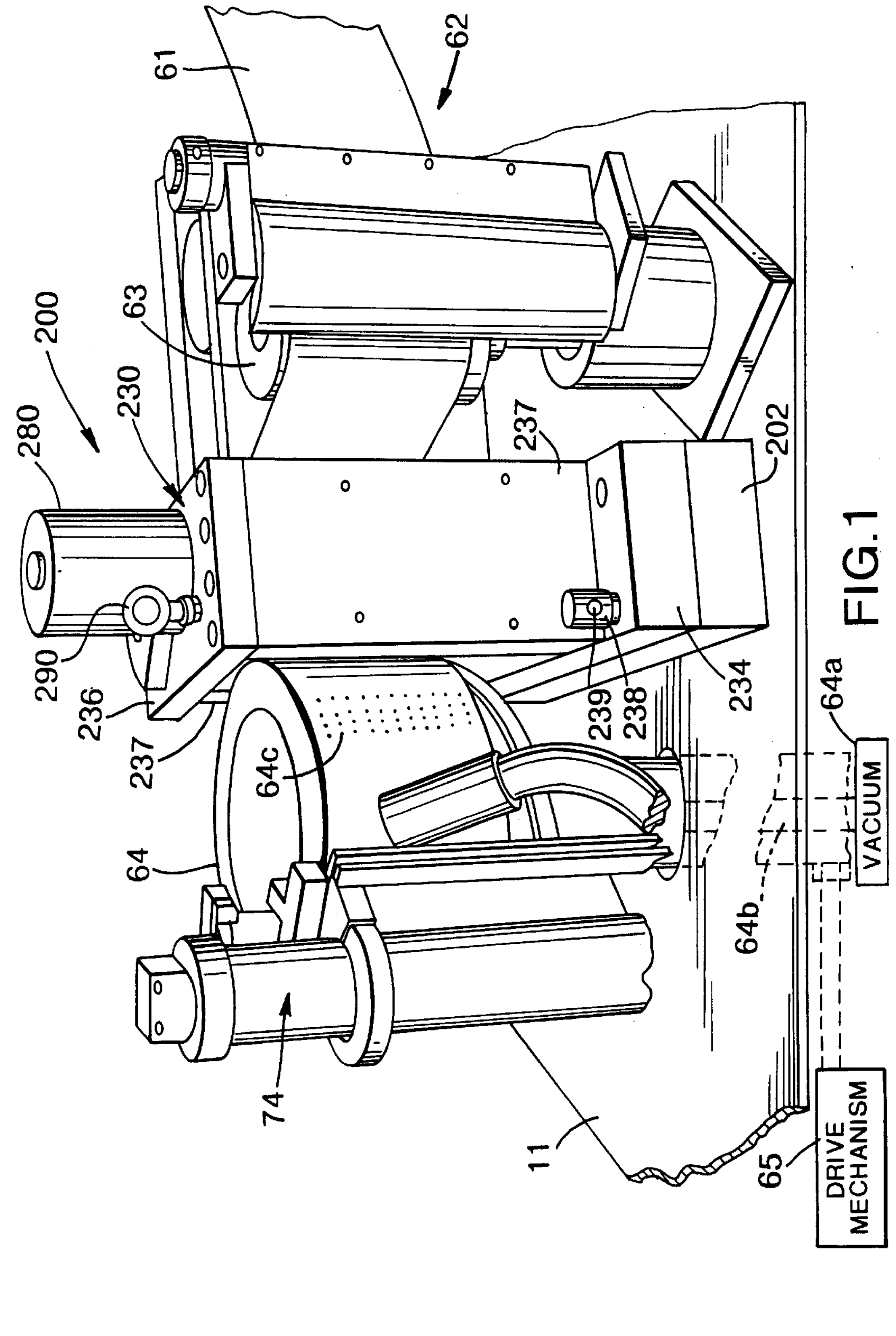
FIG. 1 is a perspective view of a portion of the labeling machine showing the cutter assembly positioned adjacent to a labeling drum, and a web feed mechanism feeding a web into the cutter assembly.

In accordance with the present invention, a labeling machine for feeding cut labels onto containers fed along a conveyor is disclosed, and includes an improved cutter assembly for rapidly changing the size of labels cut from a web of labels to match different sized containers.

In accordance with the present invention, a labeling drum is positioned adjacent to a conveyor for receiving cut labels and applying them onto containers fed along the conveyor. A cutter assembly, illustrated generally in FIG. 1 at numeral 200, is positioned adjacent to the labeling drum for receiving a web of labels, cutting the web, and transferring a cut label onto the labeling drum.

The cutter assembly 200 includes a stationary mounting plate, a drive pinion mounted on the plate, means for rotating the drive pinion in the form of a drive assembly, and a cutter roll frame received on the mounting plate. The cutter roll frame has a vertically oriented cutter roll with upper and lower ends, a central axis, and a gear positioned at the lower end for meshing with the drive pinion for rotating the cutter roll. The cutter roll gear size is directly proportional to the size of the cutter roll. The position of the central axis of the cutter roll is farther removed from the drive pinion, and the outer cutter roll surface is spaced farther from the label drum for successive larger diameter cutter rolls. A cutter roll of desired diameter is thus positioned adjacent the label drum a predetermined distance, and positioned relative to the cutter roll frame to insure proper label transferred from the cutter roll onto the label drum.

For purposes of understanding, a description of the overall labeling machine with the quick-change components described in the aforementioned '243 application is first described. Reference numerals used in the '243 application are continued throughout the description of the labeling machine. The cutter assembly and related components are later given a numerical sequence starting with numeral 200.

In the description of the labeling machine, the cutter assembly will be briefly described. After the description of the labeling machine, further details of the cutter assembly 200 and its relation to the overall operation of the labeling machine are set forth in detail.

I. General Description—Labeling Machine

The inventions described below can be used in numerous different labeling machines. For example, the series 4500 and 6500/6700 labeling machines manufactured and sold by Trine/CMS Gilbreth Manufacturing Systems, Inc., of Turlock, Calif. are suitable for use with the present invention.

Figure 2:
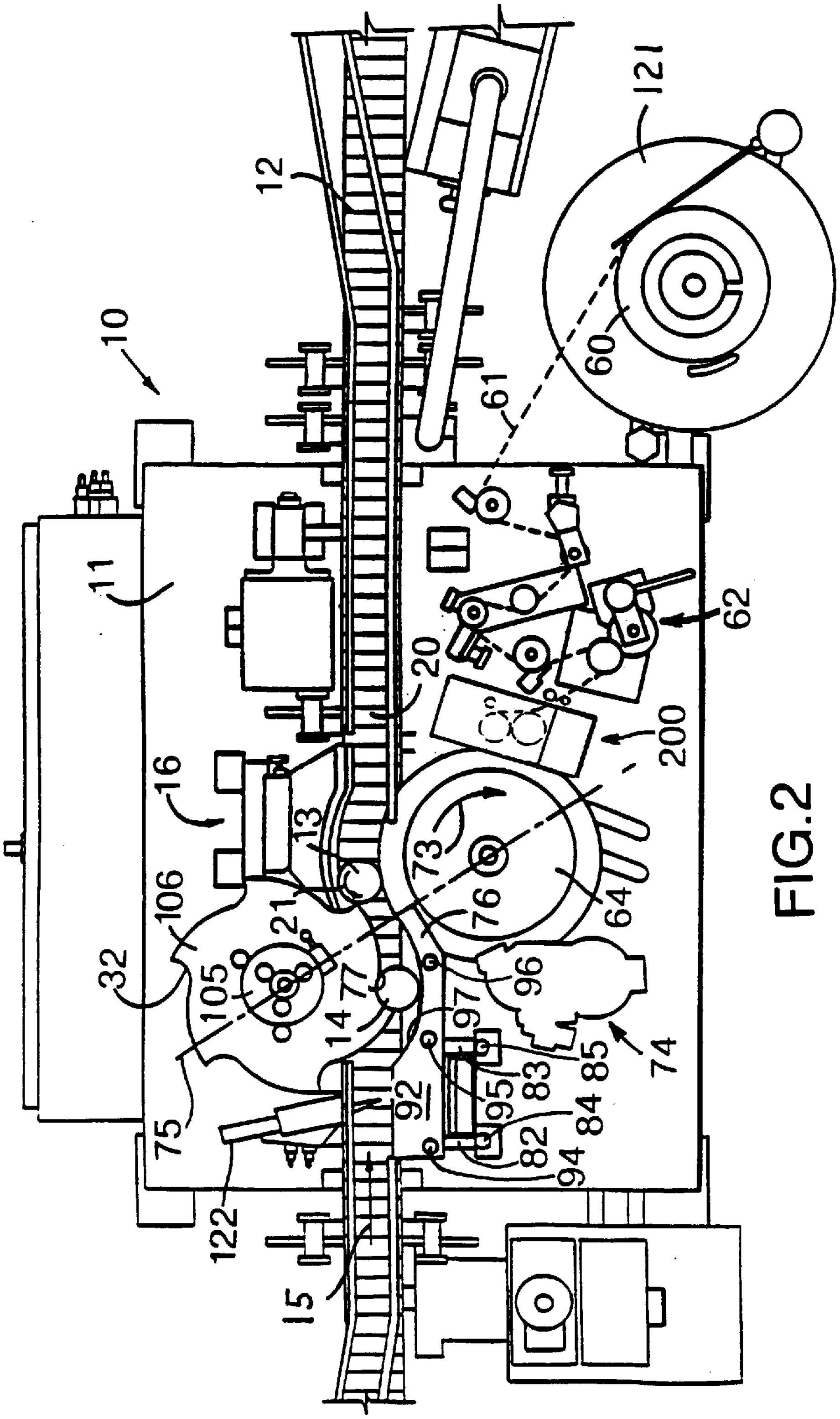
FIG. 2 is a plan view of a labeling machine that characterizes features of the invention.

For a greater understanding of the principles of the labeling machine, attention is invited to FIG. 2 which shows a labeling machine 10 that is mounted on a mounting surface or generally flat table top 11. A link belt conveyor 12 moves containers or product packages 13, 14 toward the labeling machine 10 in the direction of arrow 15. The labeling machine 10 is designed to apply labels to containers that have a broad range of sizes, or diameters for cylindrical containers. Among this spectrum of container sizes that the labeling machine 10 can process is a mid-size container that is intermediate between the maximum and minimum container sizes the machine 10 will label. Such containers can range from 6 ounce containers to liter containers.

Figure 12:
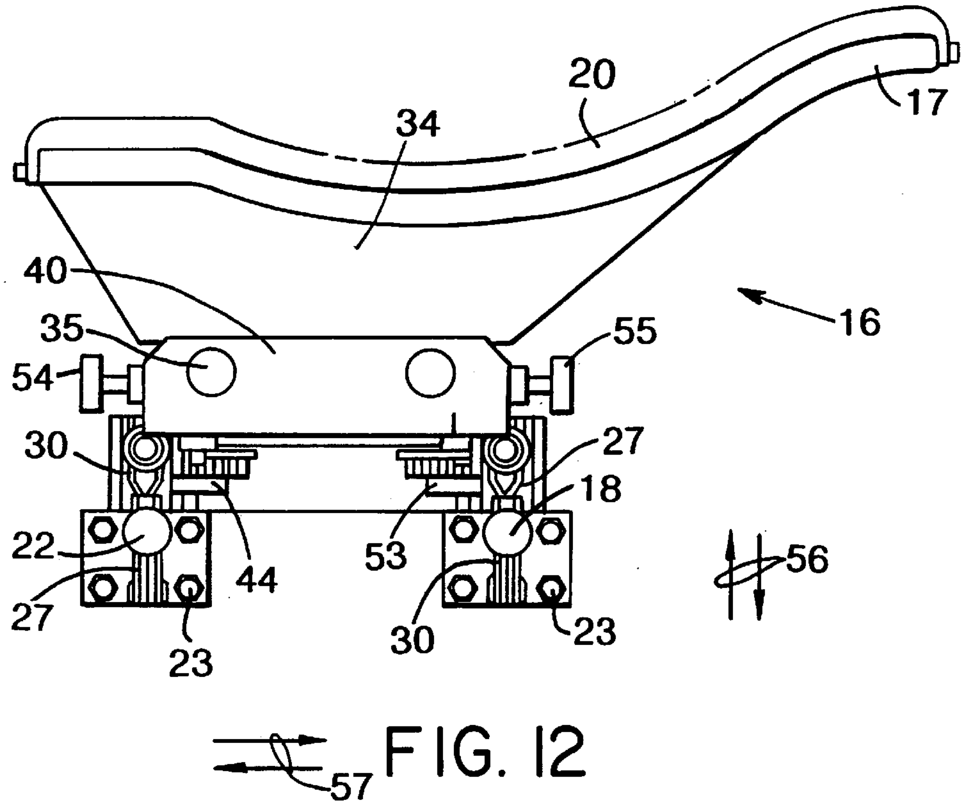
FIG. 12 is a detailed plan view of the roll-on-pad assembly that is illustrated in FIG. 1.

Containers on the conveyor 12 are first received in the labeling machine 10 by a starwheel assembly 32. The starwheel assembly 32, which will be described subsequently in more complete detail, moves the containers 13, 14 in the direction of the arrow 15 toward a roll-on-pad assembly 16. In cycling the containers 13, 14 through the labeling, the starwheel assembly 32 brings the containers past the roll-on-pad assembly 16, which imparts a counterclockwise rotation to these containers, in the direction of arrow 21. As best shown in FIG. 12, the roll-on-pad assembly 16 has a generally arcuate guide 17 that is covered with resilient padding 20. The padding 20 grips the containers and forces them to rotate in the desired direction.

Figure 13:
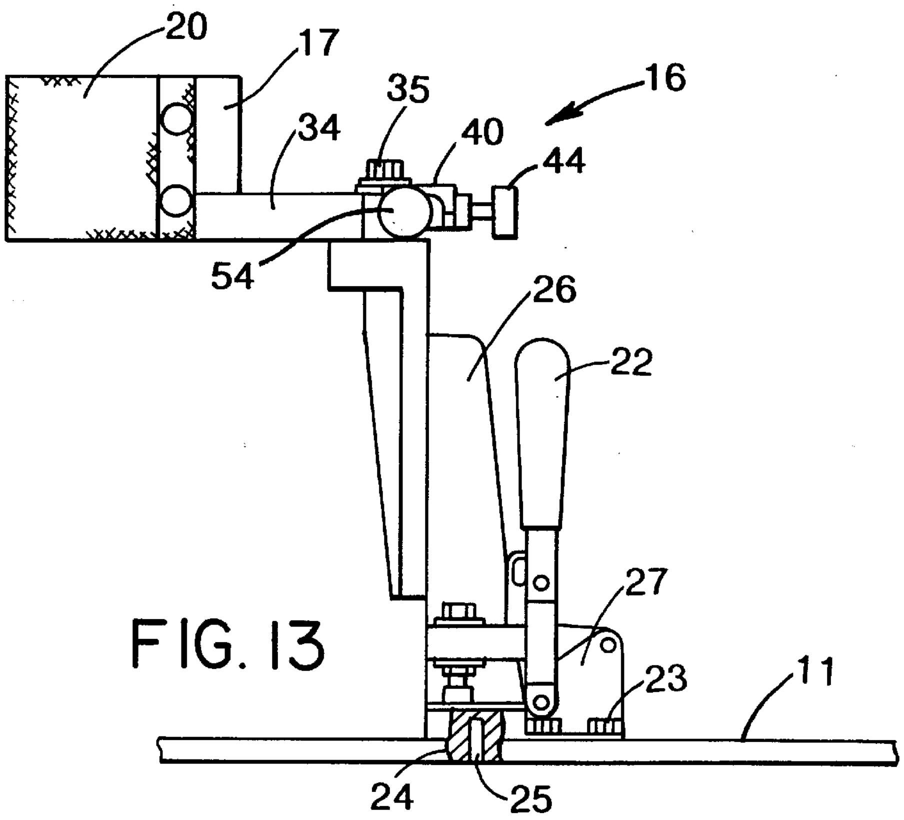
FIG. 13 is a side elevation view showing a detailed view of the roll-on-pad assembly that is shown in FIG. 1.

Turning now to FIG. 13, the roll-on-pad assembly 16 is removably mounted on the table top 11 by means of manually operated toggles 18 and 22. The toggle 22 is, as shown in the drawing, releasably coupled to a latch 27 that is fastened to the table top 11 with bolts 23.

In accordance with an important feature of the invention, alignment pins, of which only alignment pin 24 is shown in FIG. 13, protrude from the table top 11. As shown, the alignment pin 24 is received in alignment pin recess 25 that is formed in a support 26 that is a part of the roll-on-pad assembly 16. A similar alignment pin recess is formed in a companion roll-on-pad assembly support that is not shown because it is out of the plane of the drawing and directly behind the support 26, as seen in FIG. 13.

When the roll-on-pad assembly 16 is placed on the table top 11 with the alignment pin 24 and the companion pin (not shown) fully seated in the respective recesses 25, the toggles 18 and 22 (FIG. 12) are engaged with respective latches 27, 30 to press and to releasably retain the roll-on-pad assembly 16 in its precise place on the table top 11. In this manner, the position of the padding 20 (FIG. 2) relative to the container 13 on the conveyor 12 is exactly oriented to produce an alignment with the rest of the labeling machinery that is specific to the container and label sizes that the machine 10 is processing.

Turning once more to the roll-on-pad assembly 16 that is shown in FIG. 13, the support 26 provides a mounting for the arcuate guide 17 and the guide padding 20. Thus, a base 34 that is generally parallel with the table top 11 is secured on one side, by means of bolts or the like, to the arcuate guide 17. On the opposite side, the base 34 is connected to the end of the support 26 that is opposite to the alignment pin recess 25 by means of a bolt 35.

Figure 14:
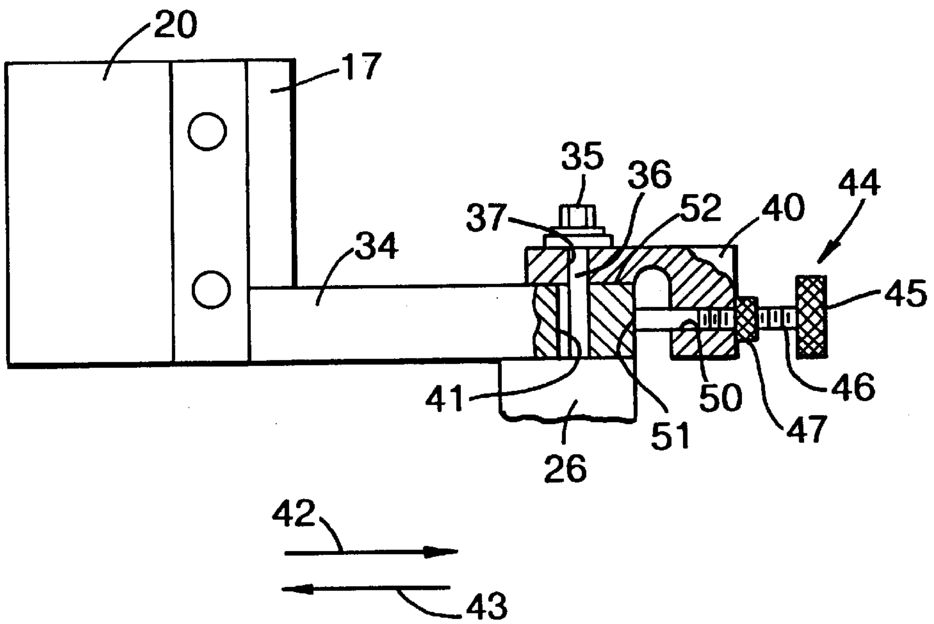
FIG. 14 is a detailed view in broken section, of a typical roll-on-pad microadjustment device, as shown in FIG. 13.

For a better understanding of this feature of the invention, attention now is invited to FIG. 14, which shows a shank 36 for the bolt 35. The shank 36 is received in a bore 37 formed in a generally L-shaped bracket 40. Within the base 34 the shank 36 is received in a further bore 41. The diameter of the bore 41, however, is considerably greater than the diameter of the shank 36 to enable the base 34 to enjoy a limited degree of movement in the direction of arrows 42, 43, relative to the support 26, and in a plane that is parallel to the table top 11 (not shown in FIG. 14). Threaded portion of the shank 36 (not shown in the drawing) is engaged in a mating, tapped recess (also not shown in the drawing) in the support 26.

As illustrated, the base 34, the arcuate guide 17 and the padding 20 can move transversely relative to the support 26 in the directions of the arrows 42, 43 if the bolt 35 has been loosened. In accordance with the invention, fine adjustments are made with respect to the position of the guide 17 (FIG. 14) and the padding 20 through the manual micrometer adjustment 44. This micrometer adjustment 44 has a knurled knob 45 for manually controlling the movement of a threaded shank 46 that passes through a nut 47 that is welded to the bracket 40 in alignment with an unthreaded bore 50 formed in the base of the L-shaped bracket 40. In this manner, the threading on the nut 47 engages the threading on the shank 46 to enable a shank end 51 to protrude from the bore 50 and bear against an opposite side 52 of the base 34, the opposite side 52 being generally perpendicular to the plane of the table top 11 (not shown in FIG. 14).

To move the base 34 in the direction of either of the arrows 42, 43, it is only necessary to loosen the bolt 35 and turn the knurled knob 45 in the appropriate direction.

Best illustrated in FIG. 12, four micrometer adjustment structures 44, 53, 54 and 55 are provided in connection with the bracket 40 and the base 34 to enable fine positional adjustments to be made for the arcuate guide 17 and the padding 20. Illustratively, the micrometer adjustment structures 44 and 53 move the base 34 in the direction of arrows 56 and the micrometer adjustment structures 54 and 55 move the base 34 in the directions of arrows 57.

Returning to FIG. 2, a roll of labels 60 provide a web 61 of labels that is drawn through a feed roller system 62 to the cutter assembly, indicated generally at 200, which includes driven feed rolls or tension rolls 63. As will be described in detail later, the cutter assembly includes a cutter drum, or roll, with a vacuum draw system for drawing a vacuum along its perforated surface to engage a label web and move it into contact with a knife edge positioned adjacent the roll. A labeling cutting blade engages the knife edge to cut the web. The vacuum draw in the cutter roll maintains the cut label on the roll surface until it reaches a point where the label is transferred to the label drum by reducing the vacuum, and in some instances, blowing a jet of air outward from the cutter roll to assist in label transfer.

Turning again to FIG. 2, the severed labels are received onto the label drum, which also can have vacuum drawn by a vacuum source 64a through vacuum channels 64b to vacuum orifices 64*c* on the surface of the label drum 64 to retain the label thereon as the label drum rotates (not shown in FIG. 2). A drive mechanism 65 is operatively connected to the label drum 64 and provides the motive force for rotating the label drum 64. The labels on the drum are rotated in the direction of arrow 73 (on the label drum 64) to a glue applicator 74. Glue is applied to the surface of the label that is exposed on the label drum 64 by the glue applicator 74. The label drum 64 rotates the leading edge of the glued label until the leading edge of the label is approximately in alignment with a line 75 between the rotational axis of the label drum 64 and the starwheel assembly 32.

As illustrated in FIG. 2, the line 75 also coincides with the termination of an arcuate infeed guide 76. The container 14 in cusp 77 of the starwheel assembly 32 is pushed by the starwheel into engagement with the leading edge of the label and the label wraps itself around the container 14, which container continues its counter-clockwise rotation as indicated through the arrow 21.

The purpose of the infeed guide 76 is to serve, in combination with the starwheel assembly 32, to present the container 13 squarely to the label drum 64 when the container 13 first contacts the label. The prior art, it will be recalled, required a tedious set of adjustments to the infeed guide position in order to adapt the infeed guide to a new container size.

Figure 11:
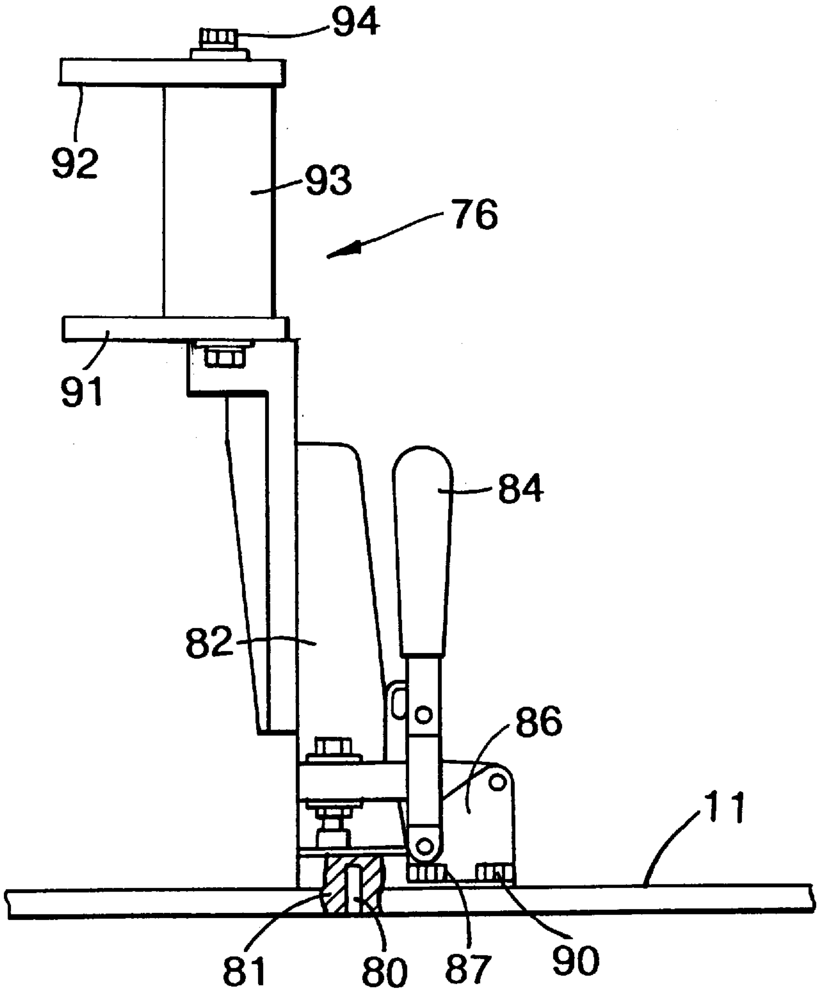
FIG. 11 is a side elevation showing a detailed view of the infeed guide assembly illustrated in FIG. 1.

In accordance with the invention, however, and as best shown in FIG. 11, the infeed guide 76 is one of a set of such guides, in which each or these guides is individually adjusted to match a specific container size. To assure correct alignment for each of the guides in the set, the infeed guide 76 is mounted on the table top 11 in a carefully aligned position established by means of infeed guide alignment pin 80 that protrudes perpendicularly from the table top 11. A second alignment pin (not shown in the drawing) also protrudes perpendicularly from the table top 11 in order to provide the precise alignment for the infeed guide 76 that characterizes this invention.

As shown, the one illustrative infeed guide pin 80 is received in an infeed guide alignment recess 81 formed in the base of an infeed guide support strut 82. As illustrated in FIG. 2, the infeed guide 76 has two support struts, the strut 82 and a strut 83. Note that it is in the base of the support strut 83 that the infeed guide alignment recess is formed to receive the alignment pin that is the companion to the pin 80, shown in FIG. 11. The struts 82 and 83 (FIG. 2), moreover, are releasably clamped to the table top 11 by means of toggles 84, 85.

Thus, in the manner described with respect to the roll-on-pad assembly 16, the illustrative toggle 84 associated with the infeed guide 76 that is shown in FIG. 11 selectively engages a latch 86. The latch 86, in turn, is secured to the table 11 by means of bolts, of which only the bolts 87 and 90 are shown in FIG. 11. The end of the strut 82 that is opposite to the alignment recess 80 is joined to infeed guide members 91, 92. These infeed guide members 91, 92 are separated from each other by means of an annular spacer 93 through which a bolt 94 is received in order to clamp together the guide members 91, 92. An array of three of the spacer 93 and bolt 94 combinations are fitted along the length of the pair of guide members 91, 92, of which, however, only the combination spacer 93 and bolt 94 are shown in FIG. 11. FIG. 2, nevertheless, does show heads for corresponding separation spacer bolts 95, 96 in the plan view projection of the apparatus.

The guide members 91, 92 (of which only the member 92 is shown in FIG. 2) each has an arcuate shape in a plane that is parallel to the table top 11. The parallel guide member 91 has the same shape as the member 92 and is spaced immediately below the member 92. As best illustrated in FIG. 2, the guide member 92 (as well as the companion member 91 that is not shown in FIG. 2) terminates, at the end of its arcuate shape, in a plane that is essentially tangent to the adjacent circumferential portion of the label drum 64.

In accordance with another feature of the invention, time and effort lavished on changing and readjusting starwheel axis translation and in timing the starwheel is avoided. Attention in this respect now is invited to FIG. 15 which shows the starwheel assembly 32 mounted on a movable plate 100. The movable plate bears against and is slidable relative to the table top 11, in a plane that is parallel to the table top.

Figure 15:
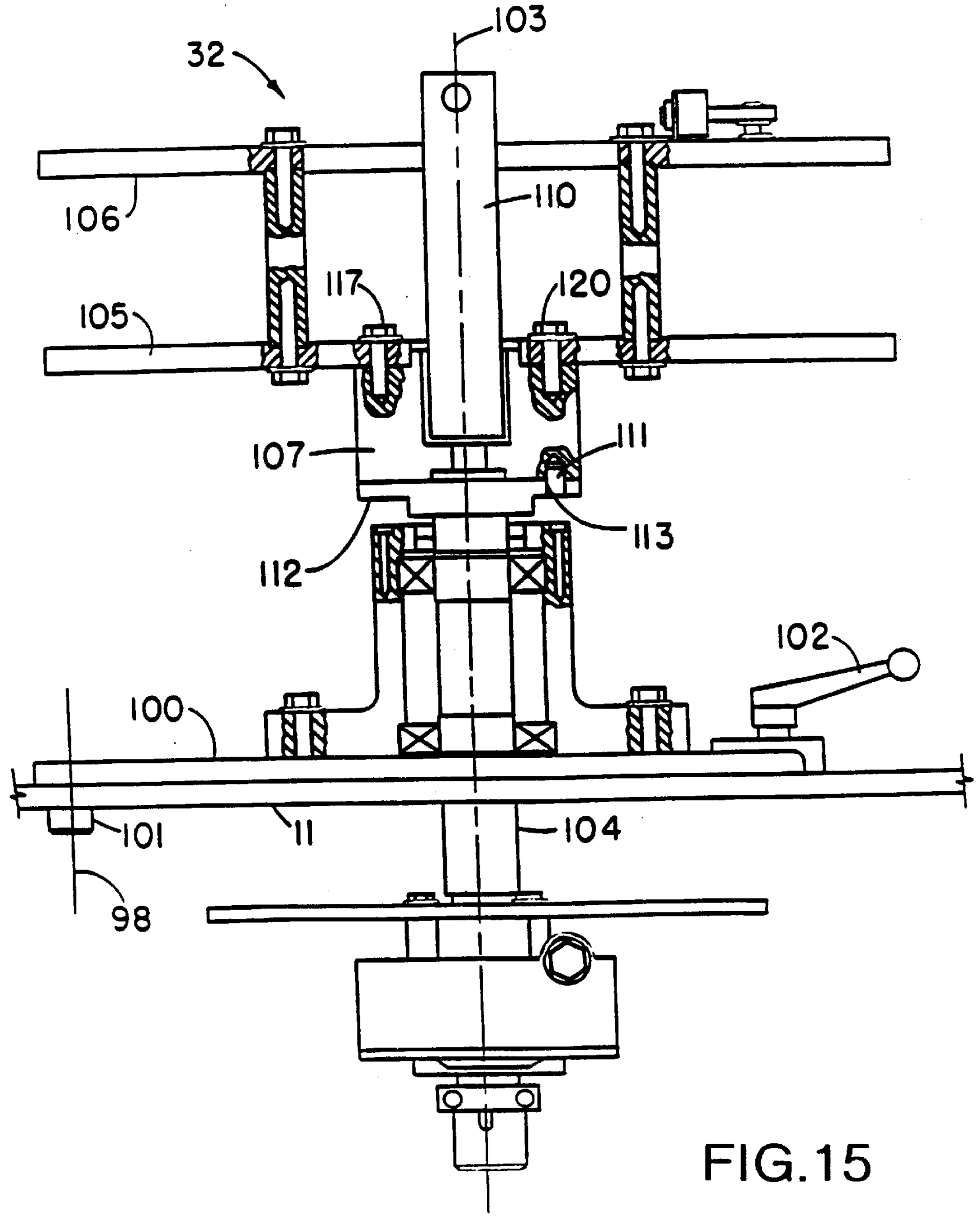
FIG. 15 is a front elevation view in broken section of the starwheel assembly that is shown in FIG. 1.

A pivot means, or shoulder bolt 101, in accordance with the invention, is in axial alignment with the driving gear or sprocket (only axis 98 of which is shown in FIG. 15) for the starwheel assembly 32. The shoulder bolt 101, in keeping with a further feature of the invention, cooperates with a clamp 102 to releasably fix the position of the starwheel assembly 32 for a specific container size. Thus, the entire starwheel assembly 32 can be pivoted about the longitudinal axis of the shoulder bolt 101 without changing the horizontal separation between the driving gear axis 98 and axis 103 of the starwheel driven shaft 104. An arcuate slot (not shown in the drawing), is formed in the table top 11 with the axes of the driving gear and shoulder bolt as the slot's center to enable the driven shaft 104 to protrude through the table top 11 and to move with the adjustments that are made to properly position the starwheel assembly 32.

Consequently, to accommodate a new container size, the clamp 102 is released, the movable plate 100 with the starwheel assembly 32 is then shifted to a new position, appropriate to the new container size that is to be labelled, and the clamp 102 is then reset.

Figure 17:
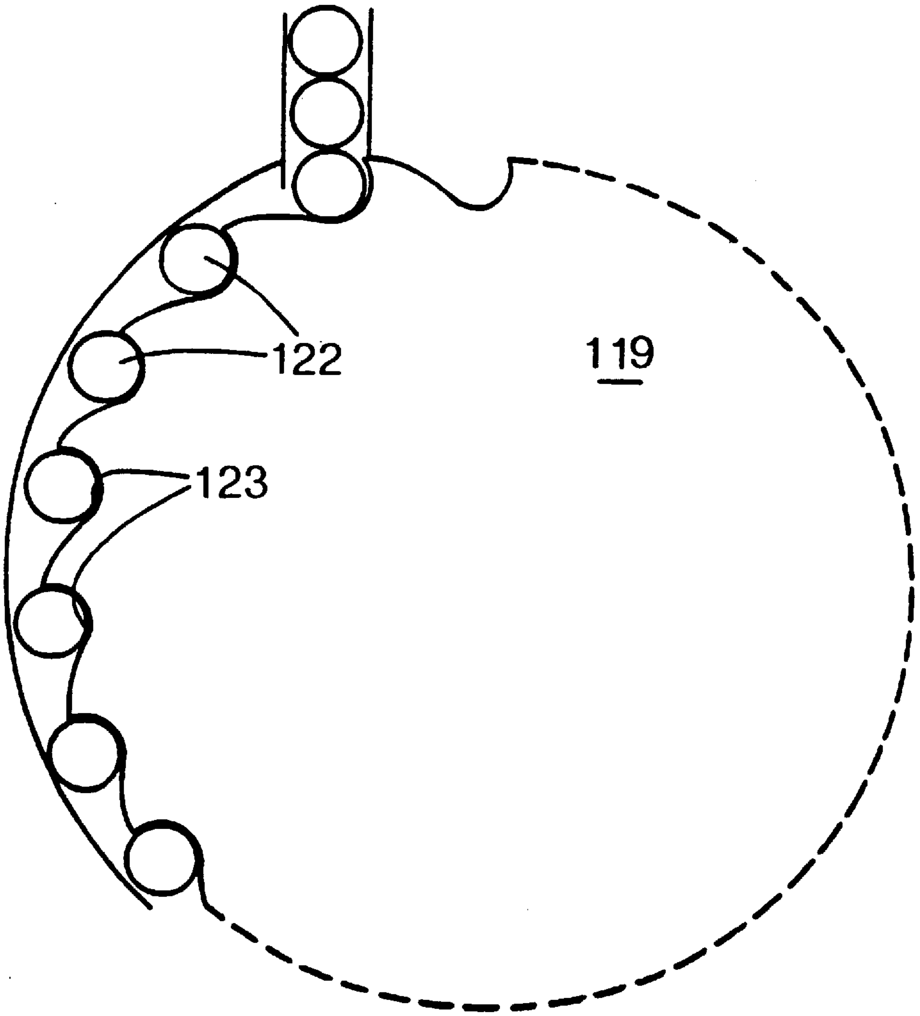
FIG. 17 (PRIOR ART)
FIG. 17 is a plan view of a prior art starwheel.

For a more profound understanding of a particularly novel feature of the invention, attention now is invited to FIG. 17, which shows a large diameter prior art starwheel 119. Note particularly that the containers 122, when seated in starwheel cusps 123, extend around a longer portion of the circumference of the starwheel 119. This longer arcuate travel for the containers 122 and the abrupt change in container direction and speed as each container is sequentially received in a respective one of the starwheel cusps 123, promotes the vibration, abrasion and side-to-side movement that the present invention minimizes.

Figure 18:
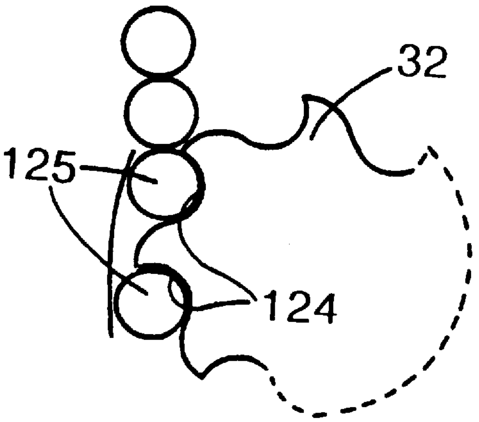
FIG. 18 is a plan view of a starwheel processing containers in accordance with principles of the invention.

To avoid these undesirable attributes of the prior art, attention now is invited to FIG. 18 which shows the starwheel assembly 32 that characterizes the invention. As shown,the cusps 124 in the starwheel assembly typically engage not more than two containers 125 in order to minimize both the angular reorientation and speed of each of the containers 125 as they are moved by the starwheel assembly 32. Further in this same regard, the distance each of the containers 125 must travel along the circumference of the starwheel is, as shown in FIG. 18, significantly reduced. For any given container size, the smaller starwheel assembly 32 reduces both the angular displacement the container is subject to as it enters the starwheel and the distance it must travel in an arcuate path. It has been found that the benefits of this smaller starwheel are most apparent if the starwheel diameter is no more than five times larger than the mid-sized container that the labeling machine 10 is designed to label.

The need to synchronize, or retime the starwheel assembly 32 each time the container size is changed also is eliminated through the practice of the invention. As illustrated in FIG. 15, starwheel members 105, 106 are coupled together and are axially spaced from each other, the starwheel member 106 and a portion of the starwheel member 105 being shown in plan view in FIG. 2. Both of the starwheel members 105, 106 (FIG. 15), however, are mounted on a hub 107. The hub 107 supports both of the starwheel members 105, 106, for rotation in planes parallel to the table top 11. The hub 107 is mounted in the exact position appropriate to a specific container size by means of a draw bolt shaft 110 that clamps the hub 107 in position. The precise location, for timing purposes for the starwheel assembly 32, however, is established through alignment pin 111 that protrudes in an axial direction from a flange 112 that is secured to an end of the starwheel driven shaft 104. The alignment pin 111 is received in a mating recess 113 that is formed in the hub 107 to assure precise repositioning of the starwheel assembly 32 each time the assembly 32 that is shown in FIG. 15 is replaced in the labeling machine 10 (FIG. 2).

Figure 16:
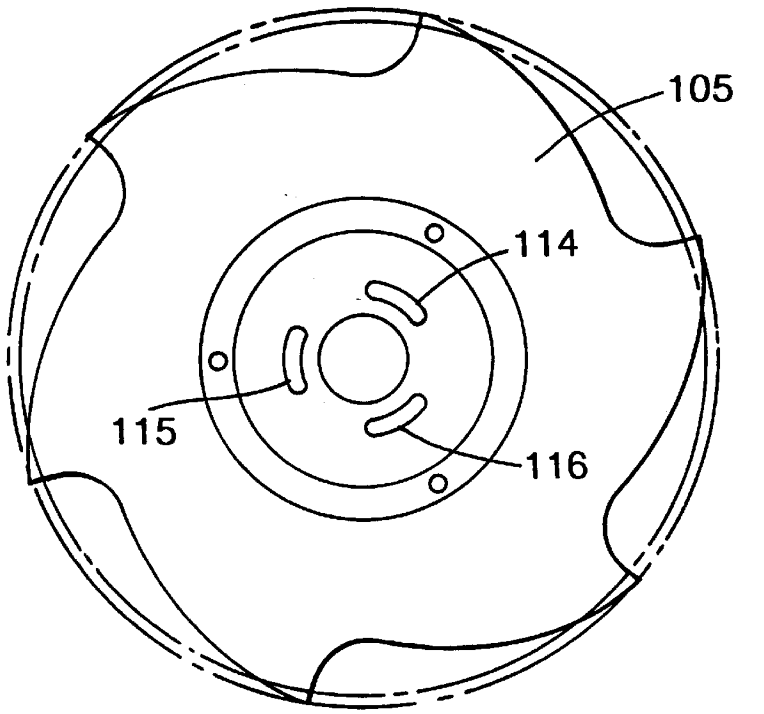
FIG. 16 is a plan view of a component for the starwheel assembly shown in FIG. 15 that embodies features of the invention.

Thus, to provide the starwheel timing required for a container of a size that is specific to the starwheel assembly 32 shown in FIG. 15, it is only necessary to select that assembly and install it on the driven shaft 104, the timing for the starwheel assembly having been accomplished earlier, through another feature of the invention. With respect to this present timing adjustment feature of the invention, the starwheel member 105, as shown in FIG. 16 is provided with three, arcuate and slotted holes 114, 115 and 116. These holes receive bolts of which only the bolts 117 and 120 are shown in FIG. 15. By releasing the bolts 117 and 120 (as well as the third companion bolt that is not shown in the drawing) the starwheel assembly 32 can be timed relative to the rest of the labeling machine 10 (FIG. 2). Rotating the starwheel assembly 32 through a suitable angle relative to the hub 107 to match the starwheel timing to that of the entire labeling machine, relative to the alignment recess 113 provides an alignment and an adjustment means that is integral with the coupled starwheel members 105, 106.

Upon properly timing the starwheel assembly 32 for a particular container size, the bolts 117 and 120 are tightened to effectively capture the specific timing for the starwheel assembly 32 by securing the starwheel member 105 to the hub 107 and thereby fixing the relation between the hub and the alignment pin 111. By establishing the timing, for each one of several starwheel assemblies that are individual to a respective container size, proper starwheel timing is immediately available for a range of container sizes by simply choosing, and then installing, the starwheel assembly that is appropriate to the next size of container to be labelled.

Figure 19:
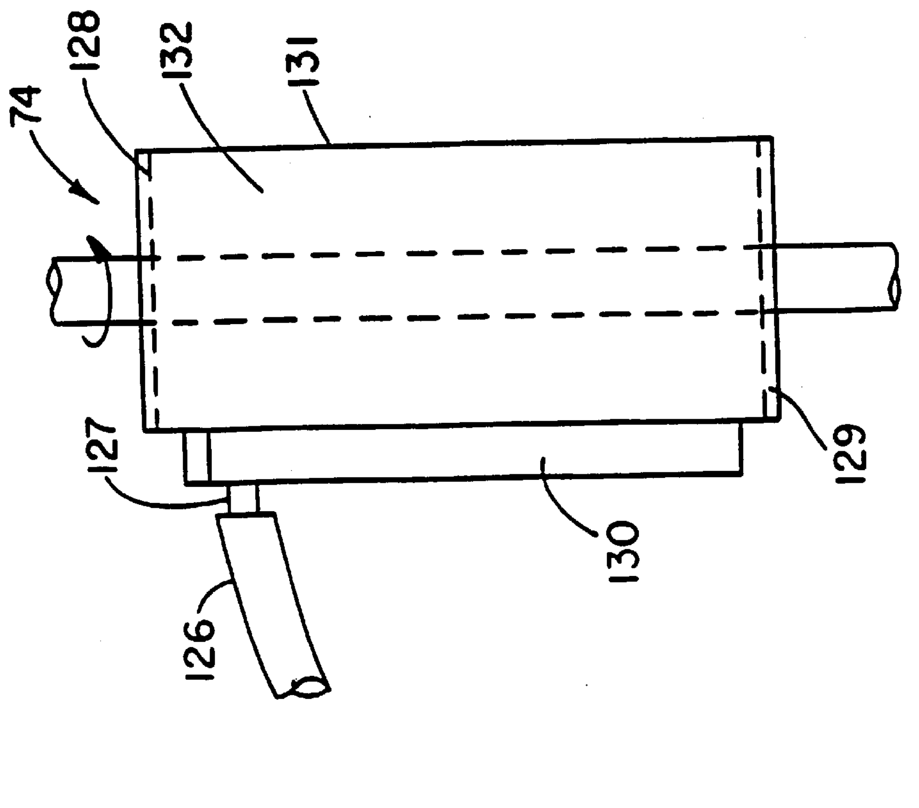
FIG. 19 is a front elevation schematic diagram of a glue bar and glue roller that can be used with the invention.

A further embodiment of the invention relates to the glue applicator 74, as shown in FIG. 2. For a more detailed appreciation of the improvements that characterize this feature of the invention, attention is invited to FIG. 19 which shows a portion of the glue applicator 74. As illustrated in FIG. 19, a labeling glue, under pressure, is pumped through a hose 126. The glue (not shown) flows through a nipple 127 to a glue bar 130, the glue bar preferably being formed of brass. A lengthwise recess (not shown) within the glue bar 130 applies a film of glue to a knurled surface 131 of a cylindrical glue roller 132. As described subsequently in more complete detail, the transverse ends of the glue roller 132 are closed by means of low thermal conductivity isolation rings 128, 129, of stainless steel or some other suitably poor conductor of heat. Further in this regard, the length of the glue roller 132 is significantly greater than the corresponding dimension of the glue bar 130. In this way, the ends of the glue roller 132 extend beyond both ends of the wetted surface of the roller that is established by the glue bar 130.

In accordance with the invention, it has been learned that a cylindrical glue roller having a circumference of not more than nine inches, which is smaller than prior art glue rollers, overcomes to a significant degree the glue "slinging" and glue "stringing" that have beset prior art glue rollers.

Figure 20:
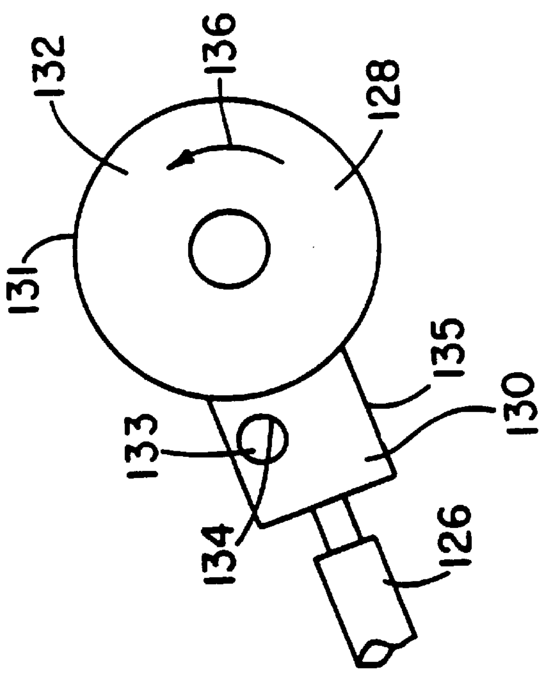
FIG. 20 is a plan view of a schematic for the glue bar and glue roller shown in FIG. 11.

Attention is now invited to FIG. 20 which shows, in plan view the glue roller 132 and the glue bar 130 that applies the film of glue to the knurled surface 131 of the glue roller 132. To maintain proper glue viscosity, it is necessary to maintain the temperature of the glue within an acceptable range. Toward this end, an additional aspect of the invention provides a heater cartridge 133 that is received in a lengthwise well 134 formed in the glue bar 130. The heater cartridge therefore transfers its heat directly to the metal body of the glue bar, and through the wetting action of the adhesive, transfers that heat to the glue roller. A temperature sensing device, or thermocouple 135 is secured to the outer surface of the glue bar 130 in order to register the temperature of the glue bar 130 and the glue within in order to keep the glue temperature within a prescribed temperature range.

Thus, the structural combination of the glue bar 130 and the small diameter glue roller combine to produce a number of important improvements. For example, the small diameter of the glue roller 132 not only overcomes a great deal of the glue "slinging" and "stringing" that accompanied prior art devices, but it also reduces the area of the exposed knurled surface 131 on the glue roller 132, thereby further reducing a source of heat loss from the film of glue that is to be applied to the label.

To provide a further barrier to heat loss from the glue roller 132, the poor thermal conductivity of the stainless steel isolation rings 128, 129 in the transverse ends of the glue roller 132 make a significant contribution.

II. Cutter Assembly

Referring now to FIG. 1, there is illustrated the cutter assembly 200 positioned adjacent the label drum 64. As noted before, the cutter assembly 200 and associated components will be described with reference numerals beginning in the 200 series. The cutter assembly 200 includes a rectangular configured stationary mounting plate 202 (FIGS. 3 and 4) fixed to the support surface 11 by fasteners such as bolts 204. A spacer 206 is positioned between the stationary mounting plate 202 and the support surface 11 at one end of the plate 202 so that the stationary mounting plate 202 is lifted a short distance from the support surface as shown in FIG. 4.

Figure 3:
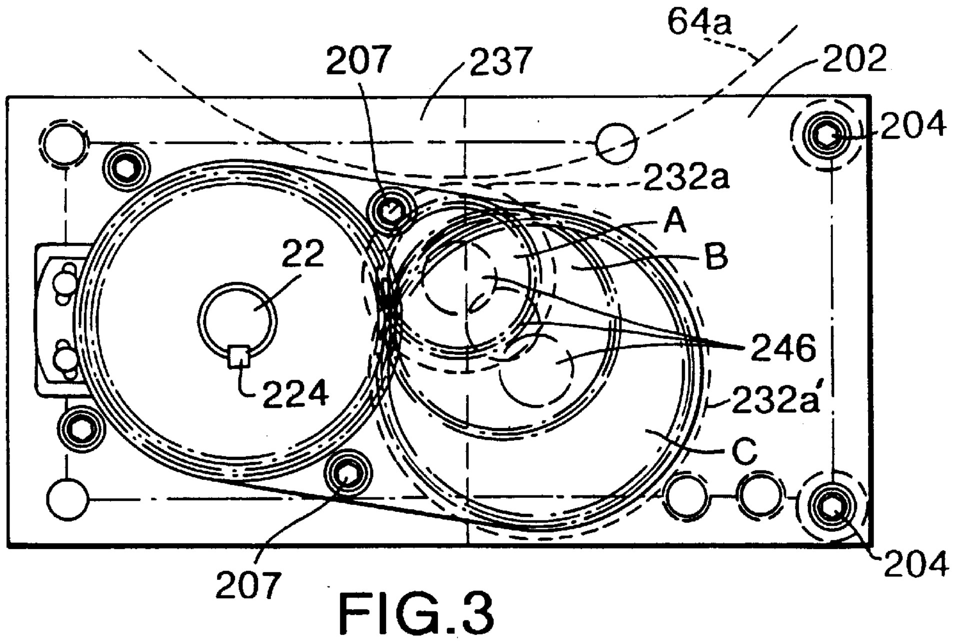
FIG. 3 is a plan view of the stationary mounting block and showing the positions of the central axis of different diameter cutter rolls, with the larger diameter cutter rolls spaced farther from the drive pinion and a greater distance from the label drum than the smaller diameter cutter rolls.
Figure 4:
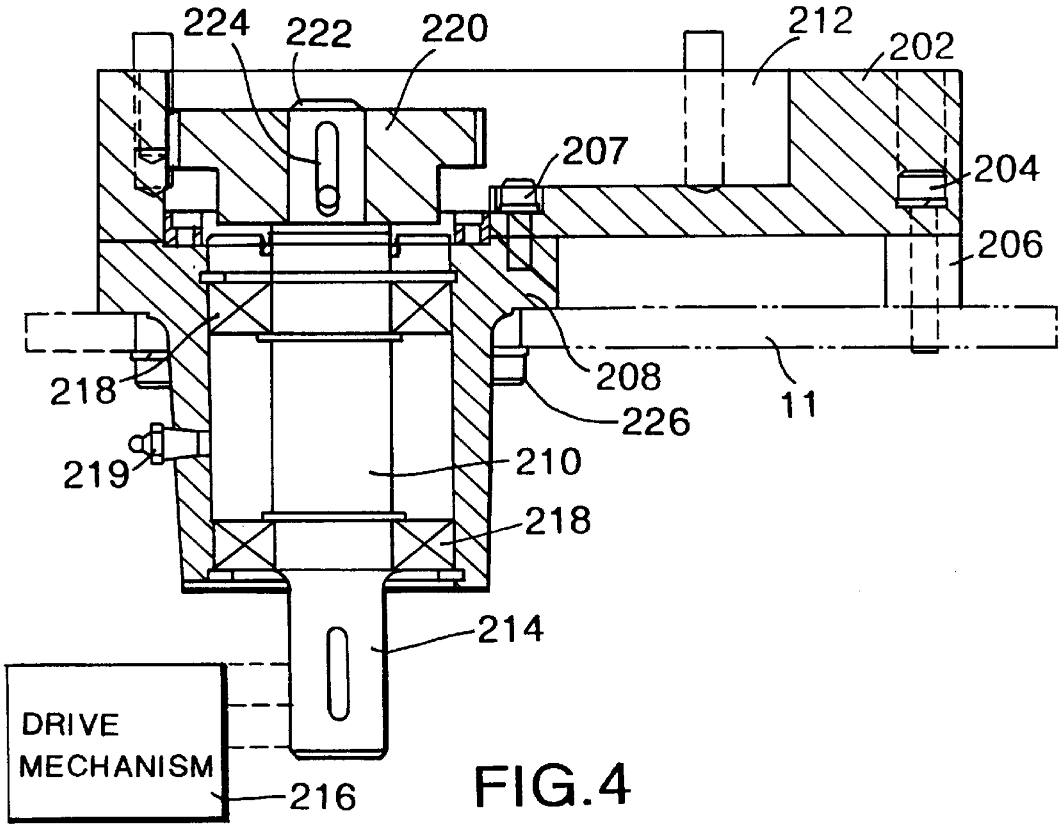
FIG. 4 is a side elevation view showing the stationary mounting plate and the drive pinion.

The other end of the stationary mounting plate 202 is secured by fasteners, such as bolts 207, onto a pinion gear support structure 208 which includes a pinion gear drive shaft 210 extending upwardly through the structure 208 into an elongated cutout 212 formed in the stationary mounting plate 202 (FIG. 3).

The lower end 214 of the pinion gear drive shaft 214 is connected to a cutter drive mechanism, indicated at block 216, which rotates the shaft 210. The pinion gear drive shaft 210 is supported in the pinion gear support structure 208 by bearing housings 218, which can be lubricated by fitting 219. A pinion gear 220 is mounted on the upper end 222 of the drive shaft and fixed by appropriate means such as a keyway type of fastener 224. As shown in FIG. 4, the pinion gear 220 is mounted in the cutout 212 on one side thereof. The pinion gear support structure 208 is mounted to support surface 11 by conventional fasteners 226.

As show n in FIG. 1, a cutter roll frame 230 is received on the stationary mounting plate 202 and includes a vertically oriented cutter roll 232 rotatably mounted within the cutter roll frame. As shown in greater detail in FIG. 5, the cutter roll frame 230 includes a rectangular configured lower support plate 234 dimensioned for mounting onto the stationary mounting plate 202. An upper support plate 236 is mounted parallel to and spaced from the lower support plate 234 and supported by opposing side frame members 237 connected to both upper and lower support plates 234, 236. The lower support plate 234, when mounted on the stationary mounting plate, is fixed relative to the outer surface 64*a* of the label drum 64. The outer surface 64*a* of the label drum 64 protrudes into a label drum receiving area 237 formed between the upper and lower support plates 234, 236. The lower support plate 234 is removably secured to the stationary mounting plate 202 by quick release fasteners 238, such as a bolt with a head having a hole 239 for receiving a rod (not shown) so that the bolt can be easily unbroken from a tight threaded fit. The cutter roll frame 230 can then be easily removed from the stationary mounting plate 202.

Figure 5:
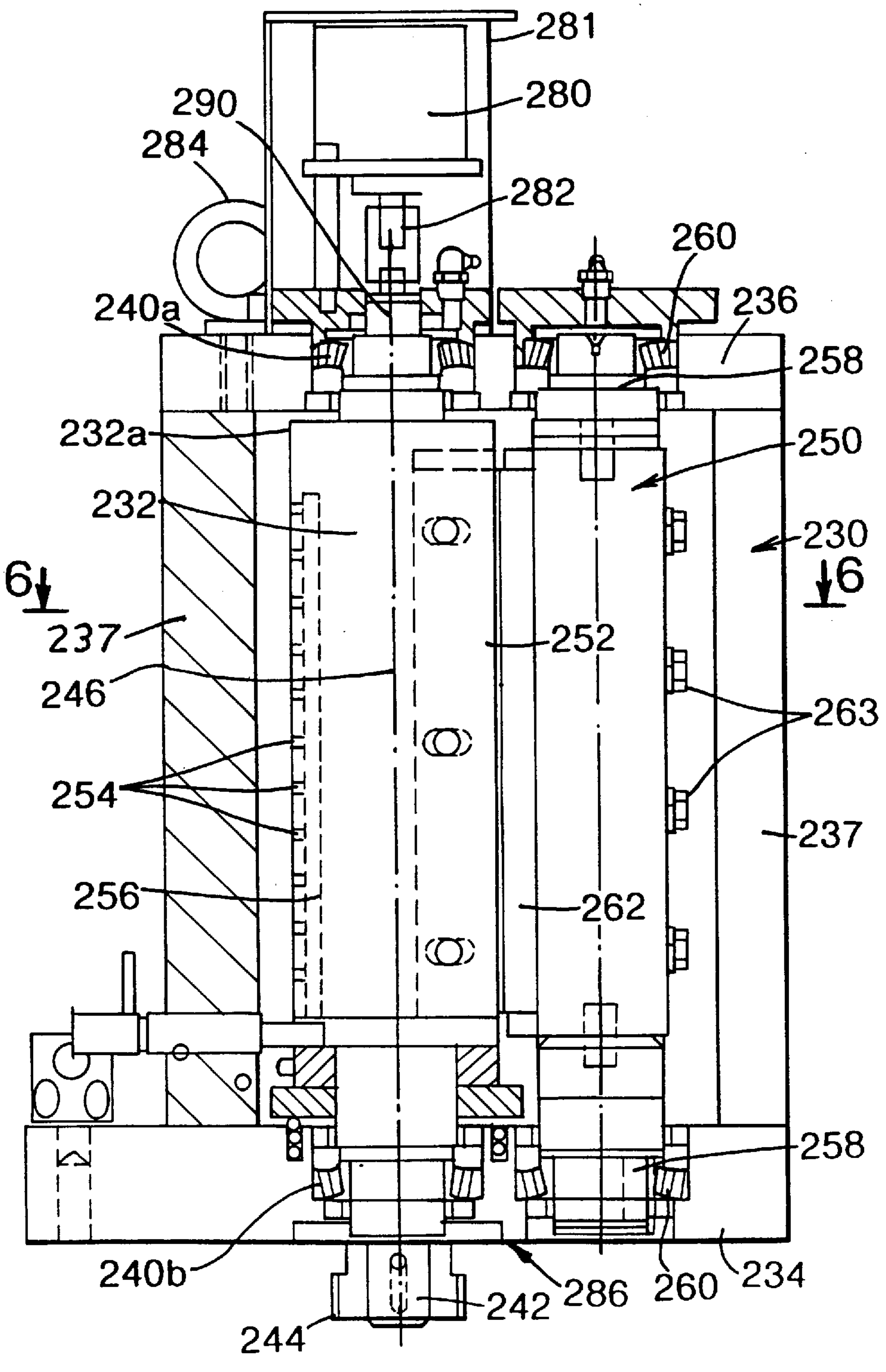
FIG. 5 is a side elevation view of a smaller diameter cutter roll and frame used for cutting smaller labels from a web.

The cutter roll 232 is supported by respective upper and lower sets of cutter roll bearing housings 240*a*, 240*b* supported by respective upper and lower support plates 234, 236 (FIG. 5). The lower end of the cutter roll 232 includes a cutter roll shaft 242 which extends through the lower bearing housing 240*b* to a position just below the lower support plate 234. A cutter roll pinion gear 244 is received over the end of the cutter roll shaft 242. As shown in FIG. 3, when the lower support plate 234 is mounted onto the stationary mounting plate 202, the cutter roll pinion gear 244 meshes with the drive pinion gear 220. The cutout 212 in the stationary mounting plate 202 is large enough to accommodate cutter roll pinion gears 244 of different diameter.

Figure 10:
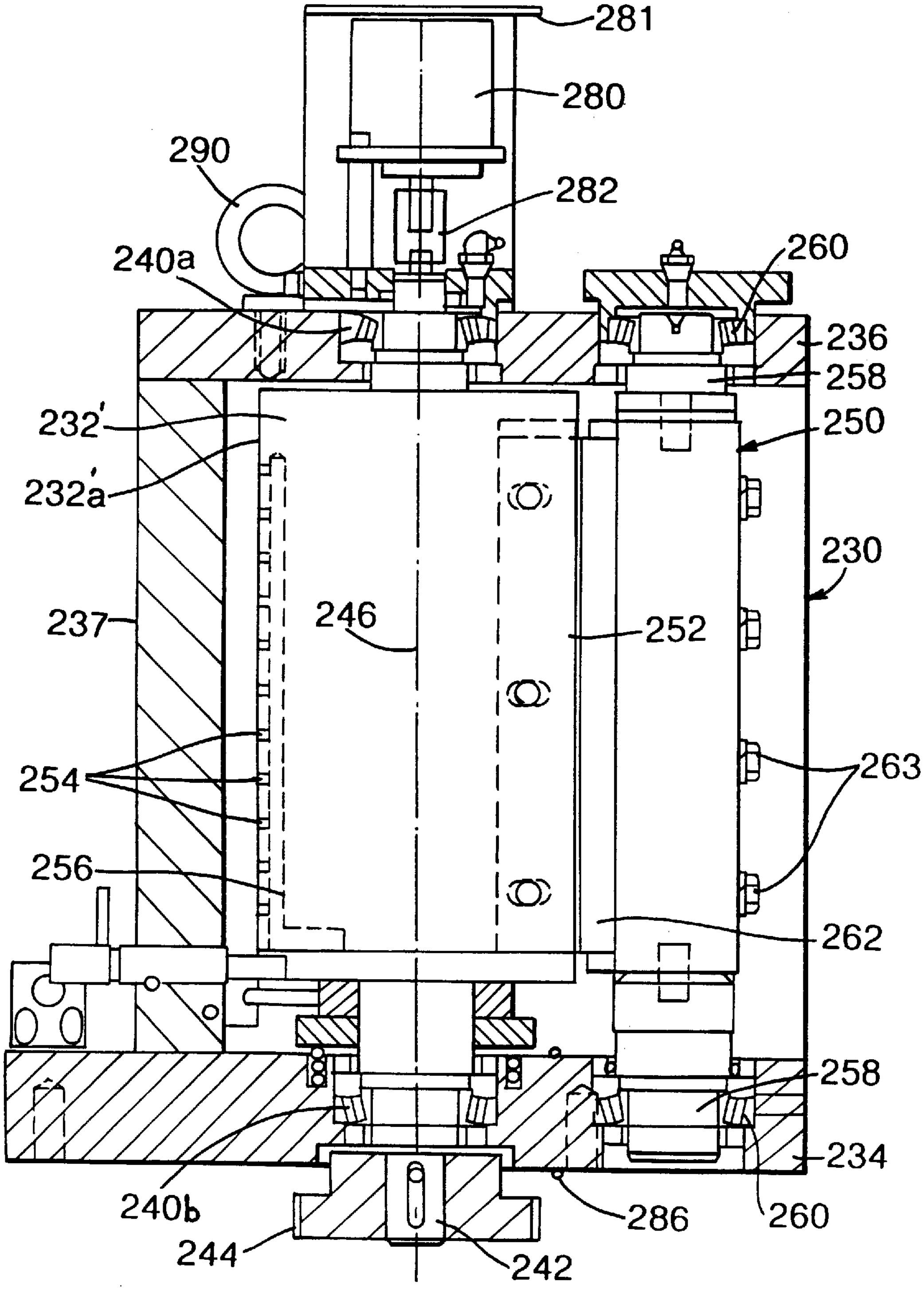
FIG. 10 is a side elevation view of another larger diameter roll.

The position of the cutter roll 232 within the cutter roll frame 230 and its position relative to the upper and lower support plates 234, 236 and the label drum receiving area 237 depends on the diameter of the cutter roll 232 and its pinion gear 244. The label drum 64 can be designed to accommodate a different size label. For example, it can be designed as a two, three or four position label drum 64. A two position label drum 64 receives two large labels on two label receiving positions, while a four position label drum 64 has four label receiving positions for receiving four smaller labels. Larger labels require the use of a larger diameter cutter roll, such as shown in FIG. 10, where the cutter roll numeral 232' is indicated by the prime notation. It has been found, that the larger diameter cutter roll should be spaced a distance from the label drum surface greater than the distance the smaller diameter cutter rolls are spaced from the label drum surface. In this regard, a larger cutter roll 232' diameter requires a larger diameter cutter roll pinion gear 244' to slow down the rotation of the cutter roll 232' because fewer labels are applied onto the label drum, which is labeling larger size containers.

The cutter roll pinion gear 244 size is directly proportional to the size of the cutter roll 232, and the position of the central axis 246 of the cutter roll is farther removed from the drive pinion gear 220, and the cutter roll outer surface 232*a* is spaced farther from the label drum 64 for successive larger diameter cutter rolls. As shown in FIG. 3, a smaller diameter cutter roll is mounted so that the surface of the smaller diameter cutter roll is positioned slightly closer to the label drum 64 surface than the outer surface 232*a* of the larger diameter cutter rolls. This is illustrated in FIG. 3 by the respective circles labeled A, B, C. Circle A represents the smallest diameter cutter roll 232 and pinion gear 244. This cutter roll outer surface 232*a* is closer to the label drum surface than the outer surface 232*a*' of the larger diameter cutter roll 232'. The outer surfaces of the smaller and larger diameter cutter rolls are indicated by the thickened dotted lines indicated by numeral 232*a* on 232*a'*.

Figure 6:
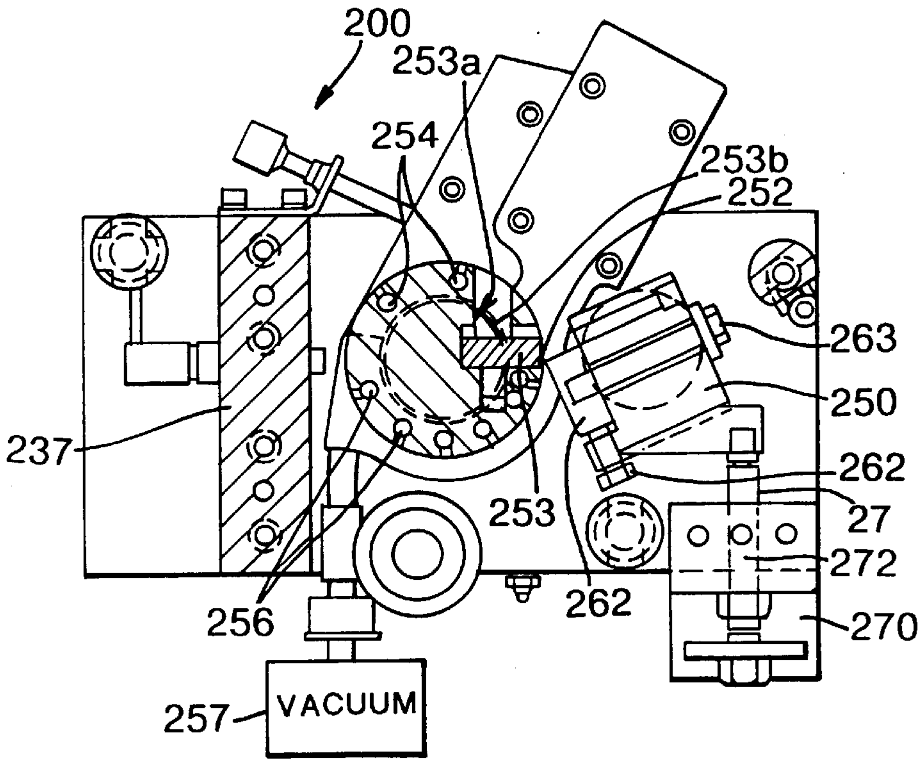
FIG. 6 is a portal sectional view of the cutter roll and the knife support block taken along line 6—6 of FIG. 5.

Referring now to FIGS. 5 through 9, greater details of the cutter assembly 200 are illustrated and show the cutter roll 232 rotably mounted in the cutter roll frame 230 and a knife support block, indicated generally at 250, pivotally mounted on the cutter roll frame 230 substantially parallel and adjacent to the cutter roll 232. The cutter roll 232 includes a label cutting blade 252 protruding from and rotatable with the cutter roll 232 (FIG. 6). The label cutting blade 252 extends substantially the longitudinal length of the cutter roll 232 as shown in FIGS. 5 and 10. As shown in FIG. 6, the label cutting blade 252 can be an insert, such as carbide insert mounted on a support 253, which is fixed in a slot 253*a* extending the length of the cutter roll. Bolts or other fasteners 253*b* hold the support 253 in the slot 253*a*.

In accordance with the present invention, the cutter roll 232 also includes a perforated surface with vacuum orifices 254 and a vacuum channel system 256 contained within the cutter roll 232 (FIGS. 5 and 6) for drawing a vacuum through the orifices 254 positioned on the cutter roll surface. The cutter roll vacuum channel system 256 is connected to a source of vacuum 257.

The knife support block 250 is positioned substantially parallel to and adjacent to the cutter roll 232 and includes upper and lower stub shafts 258 supported by bearings 260 mounted on the upper and lower support plates 234, 236. The knife support block 250 is substantially rectangular configured and includes a cutting blade edge 262, formed as a small rectangular configured, elongate, member, which is secured on the knife support block 250 by fasteners such as bolts 263 extending through the knife support block. The knife support block 250 is rotatable on the bearings 260 as shown in FIGS. 5 and 6. The cutting blade edge 262 mounted on the knife support block 250 can be adjusted by loosening the bolts 263 and moving the cutting blade edge 262 as necessary.

Figure 7:
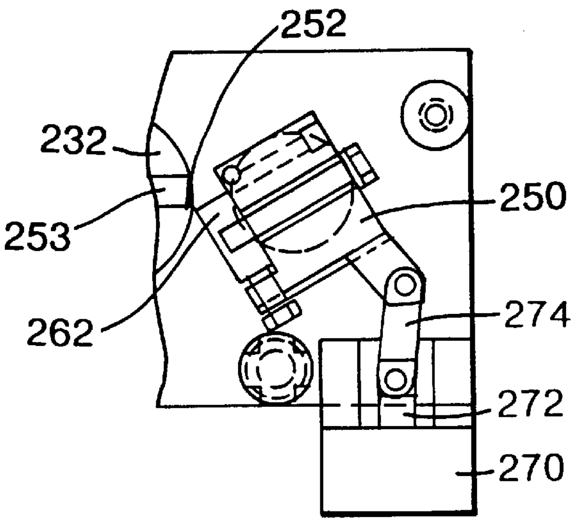
FIG. 7 shows the knife support block pivoted so that the lever arm is biased farther away from the drum and the knife edge is in an inoperative cutting position.
Figure 8:
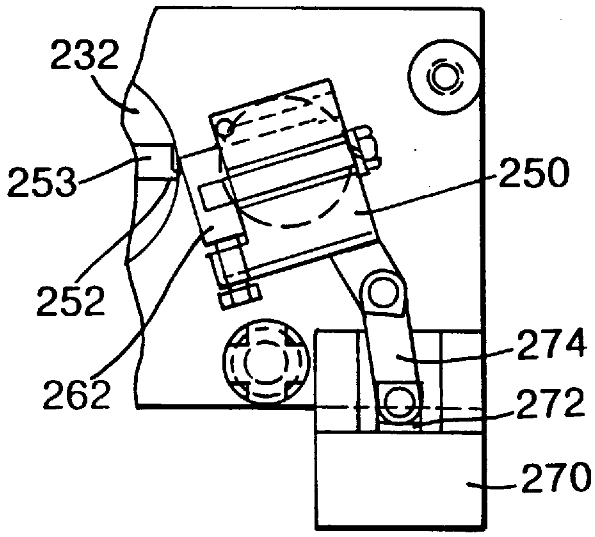
FIG. 8 is a view similar to FIG. 7, but showing the knife support block pivoted to a position where the lever arm is pivoted the most for cutting.
Figure 9:
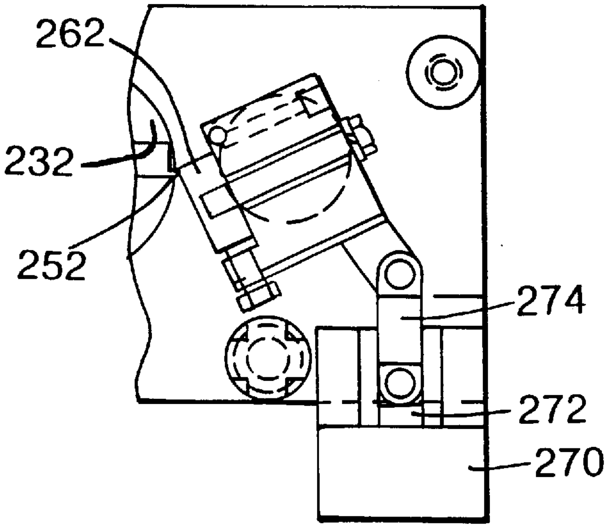
FIG. 9 is a view similar to FIG. 7, showing the knife support block pivoted so that the lever arm is straight and the knife edge is in an inoperative cutting position.

A cylinder assembly 270, such as a pneumatic cylinder, and its output shaft 272, are mounted on the cutter roll frame 230 (FIG. 6). The output shaft 272 connects to the knife support block 250 via a lever arm 274. When the cylinder assembly 270 extends the output shaft 272 and lever arm 274 its farthest distance, the cutting blade edge 262 is in a non-cutting position as shown in FIG. 7. When the shaft 272 is retracted the most such as shown in FIG. 8, the lever arm 274 is pivoted farthest to the left and the cutting blade edge 262 is in a cutting position. When the output shaft 272 is medially extended as shown in FIG. 9, the lever arm 274 is straight and the cutting blade edge 262 is in a non-cutting position.

It has been found that the distance between the edges of the two blades 252, 262 can be critical and thus the cylinder assembly 270 and its output shaft 272 as illustrated provide a precise manner of positioning the blades. In one aspect of the invention the cutter roll frame 230 is positioned so that the cutter blade edge 262 is placed close to the surface of the cylindrical label drum 64. As the two blade edges 252, 262 come into registry with each other, as shown in FIG. 9, the portion of the web that protrudes beyond the nip of these two blades is sheared from the web by the action of the blades. The sheared label is temporarily pressed against the perforated surface of the label drum because of the vacuum that is drawn within the label drum.

In one aspect of the invention, it is preferred that the special relation between the cutting blade edge 262, the label cutting blade 252, and the surface of the label drum is such that as the label is sheared from the web, about 50% or more of the surface of the label is drawn against the label drum outer surface. It has been found, in accordance with the present invention, that the diameter of the cutting roll which has heretofore been especially critical with respect to the positioning, skewing and mispositioning of the label 71 on the label drum 64 is of reduced significance if about 50% or more of the label is pressed against the label drum surface at the time the label is sheared from the web. Still, for major changes such as moving from a four position to a two position label drum, a new, large diameter cutter roll is required.

It should be noted that the surface speed of the cutter roll 232 can be slightly greater than the speed of the web, while in turn, the surface speed of the label drum 64 can be somewhat greater than the surface speed of the cutter roll 232. The web 61 is therefore, constantly under tension throughout its length until the web is actually cut, causing the web, before cutting to slip relative to both the cutter roll and the label drum. Because the majority of the label is on the label drum before the cut is made, this enables the label 71 to stay in the same position on the label drum after the cut has been made regardless of operative speed. In this circumstance, even a smaller label can be cut with the label drum being in full control of the label at the time the label is sheared from the web to assure proper positioning of the label on the drum.

As shown in FIGS. 1, 5 and 10, an encoder 280 is mounted on the top surface of the upper support plate 236 in a housing 281. The encoder 280 includes an encoder shaft 282 operatively connected to a cutter roll shaft 284 partially extending through the upper bearing housing 240*a*. The encoder 280 registers the revolutions of the cutter roll and is operatively connected to the label drum 64 for timing the label drum rotation based on the cutter roll rotation. The encoder 280 is also operatively connected to the web feed mechanism 62 for timing the label web feed based on the cutter roll rotation. It should be realized that each different diameter cutter roll 232 has its own separate encoder 280 mounted on the upper support plate 236. The entire label machine operation including the label drum rotation and web feed is timed to the cutter roll.

In accordance with the present invention, the cutter roll 232 has a zero set position in which the cutter roll is positioned when the cutter roll frame 230 is mounted on the stationary mounting plate 202. This 'zero' position could be indicated by marks 286 on the cutter roll frame 230 that align with the label cutting blade 252. The label drum 64 is also set to a zero position corresponding to where labels are received. In this manner, once the label machine 64 and cutter assembly 200 are set to the zero positions, the cutter roll frame 230 is mounted on the stationary mounting plate 202 and removably locked thereto until a cutter roll diameter change is required.

III. Label Machine Operation

In operation, to adapt the labeling machine 10 (FIG. 2) to apply a size of label to a container that is different from the label and container sizes in a production run just completed, the labeling machine 10 is deenergized. For example, the labeling operation will move from a four label drum to a two label drum, this requiring a larger diameter cutter roll. A roll 60 of new size labels is mounted on a spool 121 and the label web 61 that is drawn from the roll 60 is threaded through the feed roller system 62. If the label drum is a two label drum, the cutter roll is changed in accordance with the present invention as described below. The two bolt fasteners 238 securing the lower support plate 234 to the stationary mounting plate 202 are unscrewed and a jack bar or other means used to pry the lower support plate 234 from the support mounting plate 202. A crane hoist (not shown) is moved over the cutter assembly 202 and a crane hook connected to the eye loop 290 (FIG. 5). The crane hoist can be a short beam extending transversely over the cutter assembly, and includes a small lift mechanism.

The label drum 64 is locked into its zero position and a new cutter roll frame having a larger diameter cutter roll is placed on the stationary mounting plate and locked thereto. The cutter roll is locked in its zero position, and also includes a new encoder adapted for the larger diameter cutter roll.

The web 61 is passed over the cutter roll and the end of the web 61 is placed against the label drum 64. In one aspect of the invention, about 50% or more of the flat surface of the leading label in the web 61 is placed against the label drum and vacuum is drawn in both the label drum and the cutter roll. This way in transfer of the label onto the drum.

Returning once more to FIG. 2, it is clear that to adapt the labeling machine 10 to a new container size, the roll-on-pad assembly 16 must be changed. The usual expenditure of time and human effort in tinkering with small adjustments to provide the necessary clearance for the roll-on-pad assembly are eliminated through a further application of the invention.

Turning now to FIG. 12, by manipulating the toggles 18, 22 to unlatch and release the roll-on-pad assembly 16 from latches 27, 30 on the table top 11, the complete assembly 16 for the preceding run of containers is lifted directly off the alignment pin 24 in FIG. 13 (and the associated pin, not shown in the drawing). A differently adjusted roll-on-pad assembly 16 that is adapted to the size of container next to be labelled is installed on the alignment pin 24 and the other alignment pin, not illustrated.

The toggles 18, 22 are engaged with their respective latches 27, 30 and the new roll-on-pad assembly 16 is mounted in place, correct for the forthcoming container size, subject to some micrometer adjustment.

In a similar manner, and as shown in FIG. 2, the infeed guide 76 for the preceding labeling production run is removed from the labeling machine 10 by manipulating the toggles 84, 85 to unlatch them. For example, FIG. 11 shows the toggle 84 releasably connected to the latch 86. When unlatched, the infeed guide 76 is lifted off the alignment pin 80, as well as being lifted off the companion alignment pin that is not shown in the drawing. The infeed guide 76 that is appropriate to the new size container that is to be labelled is carefully mounted on the infeed guide alignment pins, and the toggles 84, 85 both are manipulated to engage respective latches on the table top 11 and thus firmly secure the new infeed guide 76 in place in the labeling machine 10. No adjustments are required. The proper infeed guide clearances needed to process the new size containers are established without a further expenditure of time and effort.

In a similar manner, the starwheel assembly 32 (FIG. 15) for the preceding production run is first removed by releasing the draw bolt shaft 110 from the starwheel assembly, thereby enabling the starwheel assembly with its associated hub 107 to be withdrawn from the driven shaft 104. The clamp 102 is released and the shoulder bolt 101 allows the movable plate 100 to be shifted to an angular relation for the starwheel assembly 32 that is appropriate to the new container size. When this relation is established, the clamp 102 is tightened to releasably secure the starwheel driven shaft 104 in its proper location for the new container size. In this way, much of the effort that characterized the tedious starwheel position adjustments and readjustments of the prior art is eliminated.

The starwheel assembly 32 that is appropriately timed for the new container size is mounted on the driven shaft 104 with the recess 113 in the hub 107 aligned with and seated on the alignment pin 111. The draw bolt shaft 110 then joins the starwheel assembly 32 to the driven shaft 104 without any need to undertake a retiming adjustment. In this manner, both alignment and preset adjustment that matches starwheel member timing to the timing for the labeling machine is integral with the coupled starwheel members 105, 106.

The entire labeling machine 10 (FIG. 2) now is energized to impart a rotation to the containers and to move these containers through the labeling machine 10 by advancing the containers into the cusps in the starwheel assembly 32. In this way, the containers are forced down the conveyor 12 in the direction of the arrow 15, through the infeed guide 76 and past the roll-on-pad assembly 16. Some further adjustment nevertheless may be needed, for example, as wear occurs. For this purpose, the roll-on-pad micrometer adjustment structures 44, 53, 54 and 55, best illustrated in FIG. 12, are to be employed. Thus, as shown in FIG. 14, while the labeling machine is running, the bolt 35 is loosened to enable the knurled knob 45 to be turned to move the base 34, the arcuate guide 17 and the padding 20 in the direction of arrows 42 or 43, as appropriate, to establish the proper clearance past the roll-on-pad assembly 16 for the containers while the labeling machine is in operation.

In this way, final, small adjustments can be made to the position of the roll-on-pad assembly 16 (FIG. 2) while the machine is running. These fine scale adjustments, made during labeling machine operation, avoid the need in the prior art to keep stopping, adjusting, starting, stopping, readjusting and restarting the labeling machine to introduce these small, but necessary adjustments.

Other accessories on the labeling machine 10, of which flowgate 122 is typical, are provided with indicia that correspond to a table (not shown) enumerating the indicia that are characteristic of the various container sizes suitable for labeling by means of the machine 10. By matching the indicia on the machine accessories to that shown in the table for the predetermined container and label size that is next to be run on the machine 10, a further and valuable saving in conversion time is provided.

When fully assembled for operation with the new container and label sizes, a machine that operates much more smoothly and largely without vibration is now available.

Turning now to the portion of the glue applicator 74 that is shown in FIG. 2, the glue in the hose 126 is pressurized to flow into the glue bar 130. In accordance with the invention, the heater cartridge 133 that is embedded in the well 134 is energized to warm the glue to a temperature that is within the desired range as measured through the thermocouple 135. The small diameter glue roller 132 is driven in the direction of arrow 136. In this respect, it is important that the rotational speed of the glue roller 132 is greater than that of the larger rollers that have characterized the prior art. Thus, the rotational speed of the knurled surface 131 on the roller 132 should be equal to the surface speed of larger diameter, prior art rollers in order to permit the smaller diameter roller 132 to keep pace with the labels 71 on the label drum 64.

This smaller diameter of the glue roller 132, in spite of the higher speed, as mentioned above, also seems to contribute in some way to the reduction in glue "slinging" and in glue "stringing".

It is to be understood that the above description is only one preferred embodiment of the invention. Numerous other arrangements and embodiments may be devised by one skilled in the art without departing from the spirit and scope of the invention.

That which is claimed is:

1. A labeling machine that can rapidly change a cutter used for cutting labels so as match predetermined diameter containers and feed the labels onto containers fed along a conveyor, comprising a labeling drum positioned adjacent the conveyor for receiving cut labels and applying them onto containers fed along the conveyor, and a cutter assemble positioned adjacent the labeling drum for receiving a web of labels, cutting the web and transferring a cut label onto the labeling drum, said cutter assembly including a stationary mounting plate, a drive pinion mounted on the plate, means for rotating the drive pinion, a cutter roll frame received on said mounting plate, means for removably fastening said cutter roll frame on said mounting plate, said cutter roll frame having a vertically oriented cutter roll having a diameter selected for a predetermined sized label for a predetermined sized container and having upper and lower ends, a central axis, an outer cutter roll surface and a cutter roll gear at the lower end for meshing with the drive pinion for rotating the cutter roll, wherein said cutter roll gear size is directly proportional to the size of the cutter roll, and wherein the central axis of the cutter roll is spaced farther from the drive for any successive larger diameter cutter roll that is selected when a predetermined sized label is to be cut, and means for mounting the cutter roll frame so that the cutter roll outer surface is spaced farther from the label drum for any successive large diameter cutter roll that is selected when a predetermined sized label is to be cut.

2. A labeling machine according to claim 1 including an encoder mounted on said cutter roll frame and engaging said cutter roll, and wherein said encoder is operatively connected to said label drum for timing label drum rotation based on cutter roll rotation.

3. A labeling machine according to claim 2, wherein the cutter roll has a zero position relative to said cutter roll frame.

4. A labeling machine according to claim 3 wherein said labeling drum has a zero position relative to said cutter roll.

5. A labeling machine according to claim 2 including a label web feed mechanism, wherein said encoder is operatively connected to said label web feed mechanism for timing label web feed based on cutter roll rotation.

6. A labeling machine according to claim 1 wherein said cutter roll includes a label cutting blade protruding from and rotatable with the cutter roll, and a knife edge mounted adjacent to the cutter roll for engaging the label cutting blade as the cutter roll rotates to cut labels from the label web.

7. A labeling machine according to claim 6 including a knife support block supporting the knife edge and positioned substantially parallel and adjacent to the cutter roll, and means for pivoting the knife support block for moving the knife edge into and out of engagement with the cutter roll.

8. A labeling machine according to claim 7 wherein said knife support block is mounted on the cutter roll support frame.

9. A labeling machine according to claim 1 wherein said cutter roll frame includes a lower support plate mounted onto the stationary mounting plate and an upper support plate, wherein said cutter roll is mounted vertically therebetween.

10. A labeling machine according to claim 9 wherein said lower support plate is fixed to said stationary mounting plate by fasteners that can be rapidly undone.

11. A labeling machine according to claim 10 wherein said stationary mounting plate includes an elongate cutout in which said drive pinion and cutter roll gear are received when said cutter roll frame is mounted on said stationary mounting plate, wherein said cutout is dimensioned for receiving different diameter cutter roll gears.

* * * * *

UNITED STATES PATENT AND TRADEMARK OFFICE

CERTIFICATE OF CORRECTION

PATENT NO. : 5,863,382

DATED : January 26, 1999

INVENTOR(S) : Hinton

It is certified that error appears in the above-identified patent and that said Letters Patent is hereby corrected as shown below:

Column 15, line 33, (claim 1) after "as" insert --to--.

Column 15, line 39, (claim 1) change "assemble" to --assembly--.

Column 16, line 3, (claim 1) after "drive" insert --pinion--.

Signed and Sealed this

Thirteenth Day of July, 1999

Attest:

Q. TODD DICKINSON

Attesting Officer

*Acting Commissioner of Patents and Trademarks*